(12) United States Patent
Ledlie

(10) Patent No.: US 8,660,577 B2
(45) Date of Patent: Feb. 25, 2014

(54) METHOD AND APPARATUS FOR ON-DEVICE POSITIONING USING COMPRESSED FINGERPRINT ARCHIVES

(75) Inventor: Jonathan Ledlie, Cambridge, MA (US)

(73) Assignee: Nokia Corporation, Espoo (FI)

( * ) Notice: Subject to any disclaimer, the term of this patent is extended or adjusted under 35 U.S.C. 154(b) by 310 days.

(21) Appl. No.: 12/835,611

(22) Filed: Jul. 13, 2010

(65) Prior Publication Data

US 2011/0269479 A1 Nov. 3, 2011

Related U.S. Application Data

(60) Provisional application No. 61/266,792, filed on Dec. 4, 2009.

(51) Int. Cl.
 *H04W 68/00* (2009.01)
(52) U.S. Cl.
 USPC .................................... 455/456.1; 370/338
(58) Field of Classification Search
 USPC .................................... 455/456.1; 370/338
 See application file for complete search history.

(56) References Cited

U.S. PATENT DOCUMENTS

2007/0097939 A1* 5/2007 Nylander et al. ............. 370/338
2007/0133487 A1* 6/2007 Wang et al. .................. 370/338

OTHER PUBLICATIONS

Office Action with English Summary for related Chinese Patent Application No. 201080063134.8, Jun. 18, 2013, 27 pages.
Chinese Office Action with English Summary for corresponding Patent Application No. 201080063134.8 dated Nov. 15, 2013, 6 pages.

* cited by examiner

*Primary Examiner* — Marcos Batista
(74) *Attorney, Agent, or Firm* — Ditthavong Mori & Steiner, P.C.

(57) ABSTRACT

A method and apparatus are provided for on-device positioning using compressed fingerprint archives. The method and apparatus may be configured to provide compression of localization fingerprints, to facilitate efficient on-device positioning based on the RF fingerprint model, and to estimate the physical distance between two or more devices. Embodiments of the method may receive a space-to-access point histogram that corresponds to an access point as observed in a space. The histogram may be normalized and a mean and standard deviation may be calculated from the histogram. A weight may be assigned to the access point corresponding to the frequency with which the access point is observed within the space.

24 Claims, 13 Drawing Sheets

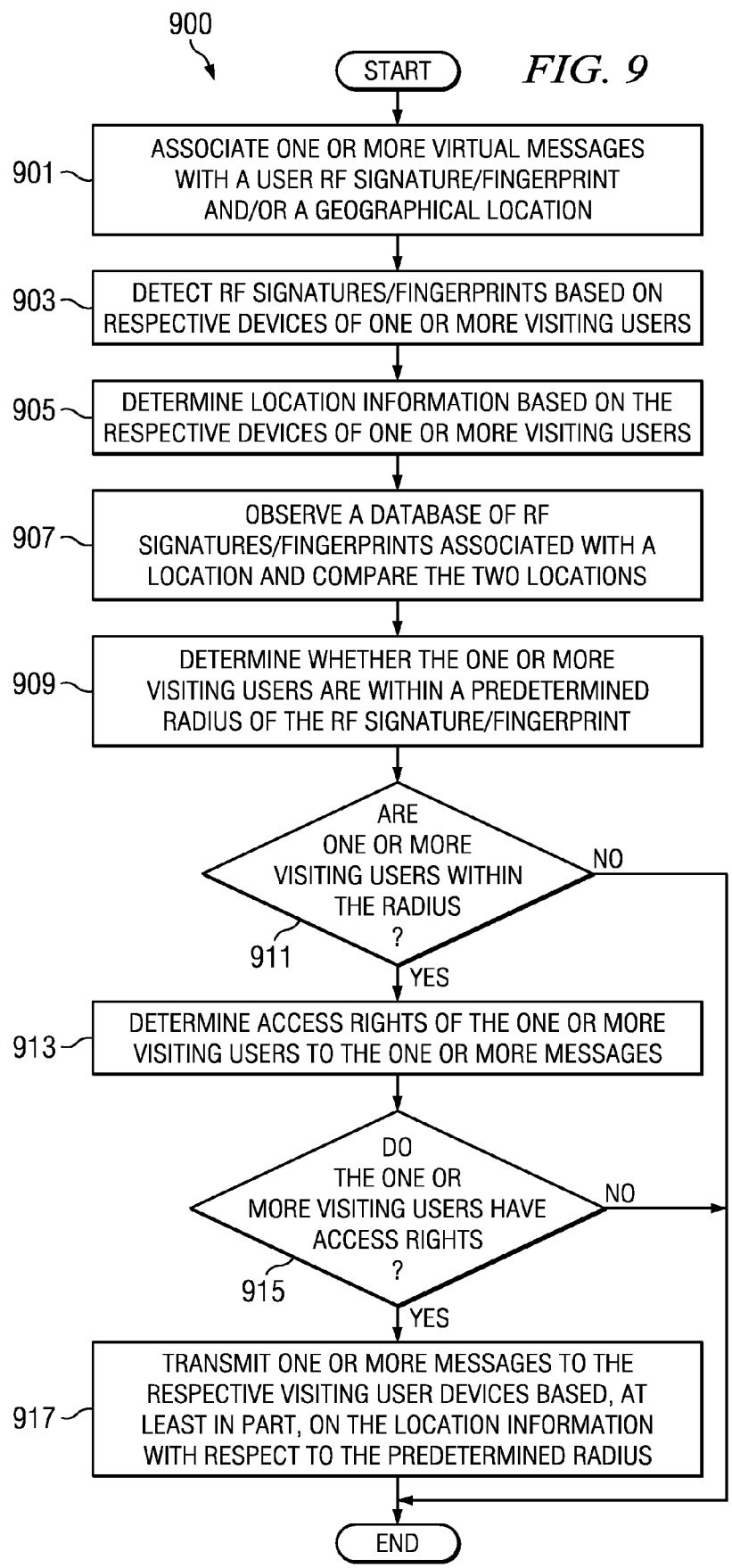

METHOD AND APPARATUS FOR ON-DEVICE POSITIONING USING COMPRESSED FINGERPRINT ARCHIVES

RELATED APPLICATIONS

This application claims priority to U.S. Application No. 61/266,792 filed Dec. 4, 2009, which is incorporated herein by reference in its entirety.

TECHNOLOGICAL FIELD

Embodiments of the present invention relate generally to computing technology and, more particularly, relate to methods and apparatus for location discovery.

BACKGROUND

Many types of computing and/or communications devices are capable of providing a wide array of functions while the devices move from place to place. These devices will be generically referenced herein as "mobile devices." For a variety of reasons, it may be advantageous for a mobile device to be able to determine its current location. For example, some mobile devices execute applications, such as calendars, reminders, navigation assistants, and communication tools having functionality that may be altered or enhanced depending upon the location of the mobile device.

Most outdoor positioning systems use a Global Positioning System (GPS), which computes a device's position by triangulating distance to a set of satellites. The GPS infrastructure includes a constellation of satellites and ground tracking stations and depends upon published updates of satellite ephemerides. In order to determine its position, a mobile device may include a GPS receiver having a radio for receiving GPS satellite transmissions as well as sufficient computation and storage resources to estimate its geo-referenced latitude, longitude, and elevation (LLE). The LLE of a mobile device may be more easily viewed in the context of a map. Because GPS functions well only in outdoor regions with substantial sky visibility, it is desirable to have alternatives for environments that are typically incompatible with GPS.

BRIEF SUMMARY

A method, apparatus, and computer program product are therefore provided for on-device positioning using compressed fingerprint archives. In general, example embodiments of the present invention provide an improvement by, among other things, providing a method of compressing localization fingerprints for storing, for example, on a mobile device. Also provided are methods for efficient on-device positioning that are based on the radio frequency fingerprint model and a method for estimating the physical distance between two or more devices. "Fingerprints," as used herein, may also be referred to as "signatures."

In one embodiment of the present invention, a method is provided that includes receiving a space-to-access point histogram that corresponds to an access point that is observed in a space. The histogram is normalized and a mean and a standard deviation are calculated from the histogram. A weight is assigned to the access point wherein the weight corresponds to the frequency with which the access point is observed within the space. The mean, the standard deviation, and the weight are combined to form a data triple that represents the access point as observed in the space. The aforementioned method may be repeated for each access point that is observed within the space such that a plurality of access points that are observed in the space are each represented by a data triple. The plurality of data triples for a space form the fingerprint for that space. The data triple or plurality of data triples with the lowest assigned weight(s) may be removed from the fingerprint. Data triples below a threshold weight may be removed from the fingerprint.

According to another embodiment of the invention, an apparatus is provided that includes at least one processor and at least one memory including computer program code. The at least one memory and the computer program code are configured to, with the at least one processor, cause the apparatus to receive a space-to-access point histogram corresponding to an access point as observed in a space. The space-to-access point histogram is normalized and a mean and a standard deviation are calculated. A weight may be assigned to the access point, the weight corresponding to the frequency with which the access point is observed within the space. A mean, a standard deviation, and a weight may be calculated for a plurality of space-to-access point histograms that are each generated in the same space. Each of the mean, standard deviation, and weight are combined to form a data triple for each of the access points observed in the space. The plurality of data triples combine to form a fingerprint. The data triple or plurality of data triples with the lowest assigned weight(s) may be removed from the fingerprint. Data triples below a threshold weight may be removed from the fingerprint.

According to yet another embodiment of the invention, a computer program product is provided that includes at least one computer-readable storage medium having computer-executable program code instructions stored therein. The computer-executable program code instructions of this embodiment include program code instructions for receiving a space-to-access point histogram corresponding to an access point as observed in a space, and computer code instructions for normalizing the space-to-access point histogram. Program code instructions may also be included for calculating the mean and the standard deviation of the histogram and program code instructions to assign a weight to the access point, where the weight corresponds to the frequency with which the access point is observed within the space. The computer program code instructions may be configured to calculate the mean, standard deviation, and weight for a plurality of space-to-access point histograms. The mean, standard deviation, and weight for a particular access point are combined to form a data triple that represents the access point as observed in the space. The plurality of data triples combine to form a fingerprint. The data triple or plurality of data triples corresponding to the lowest assigned weight(s) may be removed from the fingerprint. Data triples below a threshold weight may be removed from the fingerprint.

BRIEF DESCRIPTION OF THE SEVERAL VIEWS OF THE DRAWING(S)

Having thus described embodiments of the invention in general terms, reference now will be made to the accompanying drawings, which are not necessarily drawn to scale, and wherein:

FIG. 9 is a flowchart of a process for setting up one or more virtual messages and for retrieving one or more virtual location-based messages, according to one embodiment;

DETAILED DESCRIPTION

Figure 1:
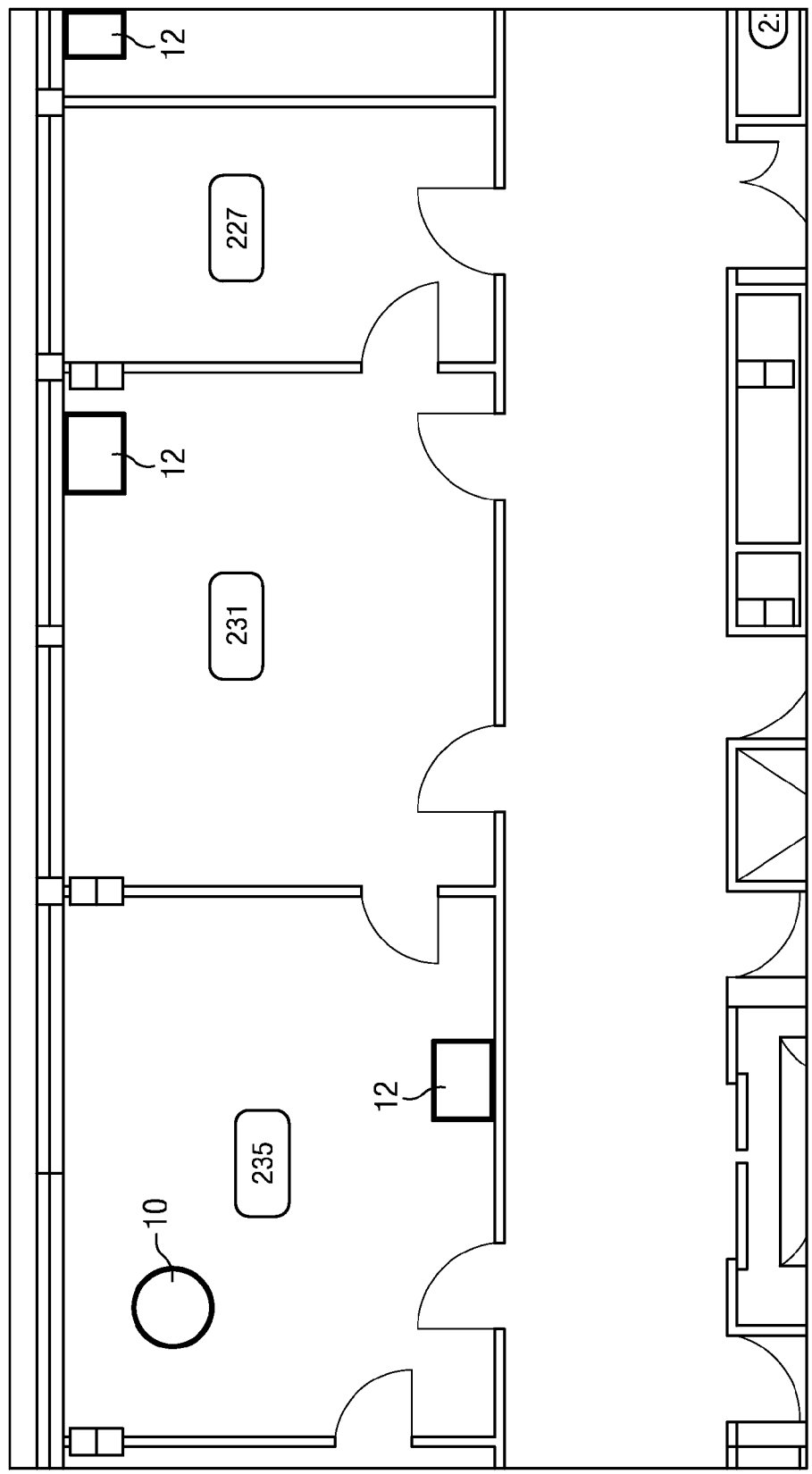
FIG. 1 is a schematic floor plan of a portion of a building illustrating a mobile device and a plurality of signal sources.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 depicts the floor plan of a portion of building. As shown, the building is divided into a number of spaces by walls, doors, windows and the like. For example, it could be a portion of an office area, a residential area, a shopping area and/or the like. In accordance with embodiments of the present invention, a mobile device 10 within the building may advantageously determine its location, such as in terms of the room in which the mobile device is currently located. As explained below, the mobile device may identify a wireless fingerprint present at its current geographical location and, based upon this wireless fingerprint and its association with a predefined geographical location, may determine its current location to be the predefined geographical location with which the wireless fingerprint has been previously associated. By way of example, FIG. 1 depicts three wireless signal sources 12, such as access points for a wireless local area network or the like, that emit wireless signals that combine to define the wireless fingerprint detected by the mobile device in room 235.

Localization may be performed in an indoor environment through fingerprint-based localization that characterizes the spatial variation available in radio signals, such as 802.11 and cellular broadcasts and compiling this information on to a virtual map. Each mobile device can then estimate its location by identifying the space within the map whose fingerprint most closely match any fingerprint recently observed by the device. Fingerprint-based localization may be preferable over radio maps as radio maps can experience large errors indoors due to multi-path effects.

In addition to determining whether the wireless fingerprint detected by the mobile device 10 has previously been associated with a predefined geographical location, embodiments of the present invention may also permit the identification of the current location, such as via user input to the mobile device, and the subsequent association of the wireless fingerprint detected by the mobile device with the identified location, thereby permitting population of a database from which subsequent comparisons will be made. By providing both for the automatic determination of the current location based on previously observed wireless fingerprints and for user identification of the current location, the method, apparatus and computer program product of embodiments of the present invention may advantageously meld both the survey and use aspects of the location discovery technique so as to concurrently support both use of the location discovery technique and further population of a database from which subsequent comparisons will be made.

Figure 2:
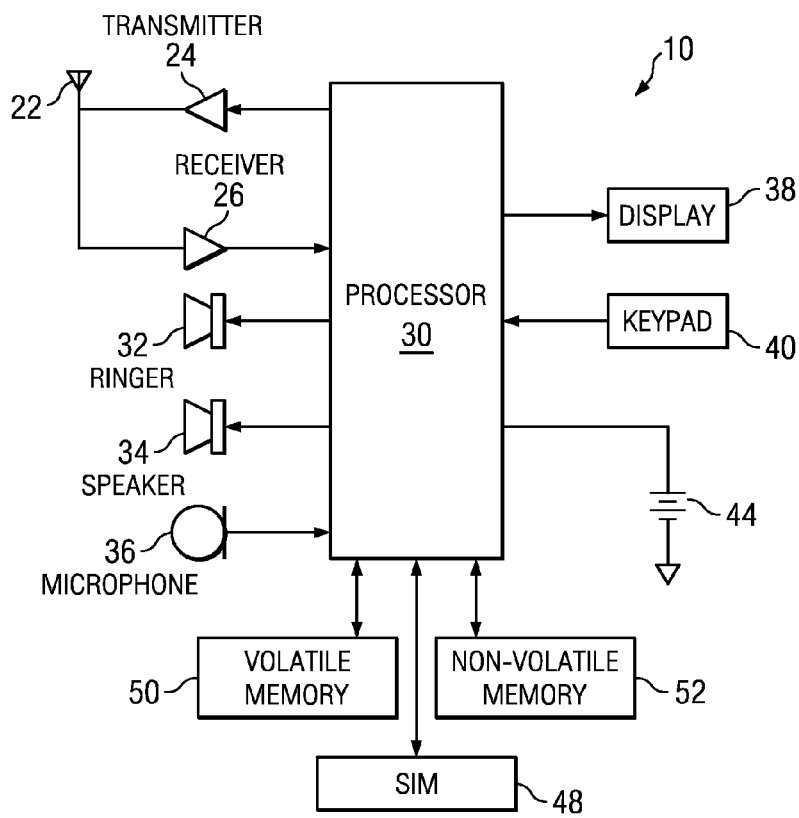
FIG. 2 is a block diagram of a mobile device, according to one embodiment of the present invention.

Although the mobile device 10 may be configured in various manners, one example of a mobile device that could benefit from embodiments of the invention is depicted in the block diagram of FIG. 2. While one embodiment of a mobile device will be illustrated and hereinafter described for purposes of example, other types of mobile devices, such as portable digital assistants (PDAs), pagers, mobile televisions, gaming devices, all types of computers (e.g., laptops or mobile computers), cameras, audio/video players, radios, or any combination of the aforementioned, and other types of mobile devices, may employ embodiments of the present invention. As described, the mobile device may include various means for performing one or more functions in accordance with embodiments of the present invention, including those more particularly shown and described herein. It should be understood, however, that a mobile device may include alternative means for performing one or more like functions, without departing from the spirit and scope of the present invention.

The mobile device 10 of the illustrated embodiment includes an antenna 22 (or multiple antennas) in operable communication with a transmitter 24 and a receiver 26. The mobile device may further include an apparatus, such as a processor 30, that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile device may be capable of operating with one or more air interface standards, communication protocols, modulation types, and access types. By way of illustration, the mobile device may be capable of operating in accordance with any of a number of first, second, third and/or fourth-generation communication protocols or the like. For example, the mobile device may be capable of operating in accordance with second-generation (2G) wireless communication protocols IS-136, global system for mobile communications (GSM) and IS-95, or with third-generation (3G) wireless communication protocols, such as universal mobile telecommunications system (UMTS), code division multiple access 2000 (CDMA2000), wideband CDMA (WCDMA) and time division-synchronous code division multiple access (TD-SCDMA), with 3.9G wireless communication protocol such as E-UTRAN (evolved-UMTS terrestrial radio access network), with fourth-generation (4G) wireless communication protocols or the like.

It is understood that the apparatus, such as the processor 30, may include circuitry implementing, among others, audio and logic functions of the mobile device 10. The processor may be embodied in a number of different ways. For example, the processor may be embodied as various processing means such as processing circuitry, a coprocessor, a controller or various other processing devices including integrated circuits such as, for example, an ASIC (application specific integrated circuit), an FPGA (field programmable gate array), a hardware accelerator, and/or the like. In an example embodiment, the processor is configured to execute instructions stored in a memory device or otherwise accessible to the processor. As such, whether configured by hardware or software methods, or by a combination thereof, the processor 30 may represent an entity capable of performing operations according to embodiments of the present invention, including those depicted in FIG. 4, while specifically configured accordingly. The processor may also include the functionality to convolutionally encode and interleave message and data prior to modulation and transmission.

The mobile device 10 may also comprise a user interface including an output device such as an earphone or speaker 34, a ringer 32, a microphone 36, a display 38, and a user input interface, which may be coupled to the processor 30. The user input interface, which allows the mobile device to receive data, may include any of a number of devices allowing the mobile device to receive data, such as a keypad 40, a touch display (not shown) or other input device. In embodiments including the keypad, the keypad may include numeric (0-9) and related keys (#, *), and other hard and soft keys used for operating the mobile device. Alternatively, the keypad may include a conventional QWERTY keypad arrangement. The keypad may also include various soft keys with associated functions. In addition, or alternatively, the mobile device may include an interface device such as a joystick or other user input interface. The mobile device may further include a battery 44, such as a vibrating battery pack, for powering various circuits that are used to operate the mobile device, as well as optionally providing mechanical vibration as a detectable output.

The mobile device 10 may further include a user identity module (UIM) 48, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile device may be equipped with memory. For example, the mobile device may include volatile memory 50, such as volatile Random Access Memory (RAM) including a cache area for the temporary storage of data. The mobile device may also include other non-volatile memory 52, which may be embedded and/or may be removable. The non-volatile memory may additionally or alternatively comprise an electrically erasable programmable read only memory (EEPROM), flash memory or the like. The memories may store any of a number of pieces of information, and data, used by the mobile device to implement the functions of the mobile device. For example, the memories may include an identifier, such as international mobile equipment identification (IMEI) code, capable of uniquely identifying the mobile device.

Figure 3:
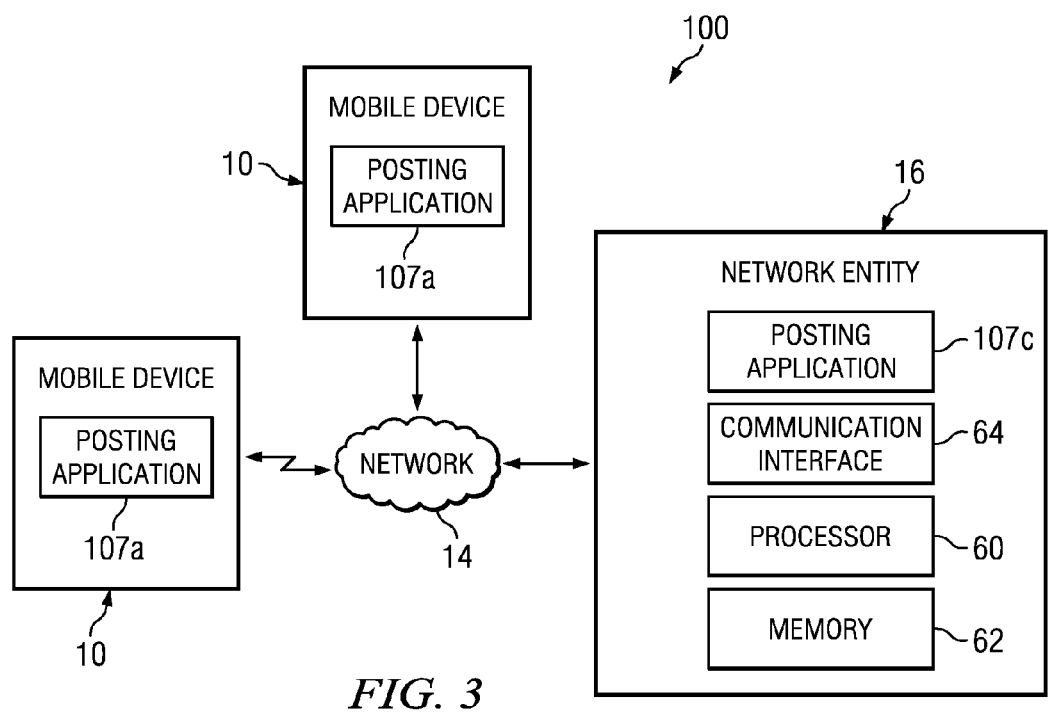
FIG. 3 is a schematic representation of a system for supporting embodiments of the present invention.

The mobile device 10 may be configured to communicate via a network 14 with a network entity 16, such as a server as shown in system 100 of FIG. 3, for example. The network may be any type of wired and/or wireless network that is configured to support communications between various mobile devices and various network entities. For example, the network may include a collection of various different nodes, devices or functions such as the server, and may be in communication with each other via corresponding wired and/or wireless interfaces. Although not necessary, in some embodiments the network may be capable of supporting communications in accordance with any one of a number of first-generation (1G), second-generation (2G), 2.5G, third-generation (3G), 3.5G, 3.9G, fourth-generation (4G) level communication protocols, long-term evolution (LTE) and/or the like.

As described below, the server 16 may include or be associated with a database that may be accessible by a plurality of mobile devices 10 via the network 14. This database may maintain a plurality of predefined wireless fingerprints, such as previously observed wireless fingerprints (as used by way of example herein), in association with their respective, predefined geographical locations. Based upon an analysis of at least a subset of the information within the database, a mobile device may identify its current location by matching the current wireless fingerprint with a previously observed wireless fingerprint that is associated with a predefined geographical location. In one embodiment, the database is commonly accessible by a plurality of mobile devices. In another embodiment, the database is semi-private with the database only being accessible by a subset of mobile devices, such as the mobile devices of employees of a particular corporation, but not other mobile devices. In yet another embodiment, the database may be private with a mobile device only being able to access the wireless fingerprints that have been contributed by the respective mobile device. As shown in FIG. 3, a block diagram of a network entity 16 capable of operating as a server or the like is illustrated in accordance with one embodiment of the present invention. The network entity may include various means for performing one or more functions in accordance with embodiments of the present invention, including those more particularly shown and described herein. It should be understood, however, that the network entity may include alternative means for performing one or more like functions, without departing from the spirit and scope of the present invention.

In the illustrated embodiment, the network entity 16 includes means, such as a processor 60, for performing or controlling its various functions. The processor may be embodied in a number of different ways. For example, the processor may be embodied as various processing means such as processing circuitry, a coprocessor, a controller or various other processing devices including integrated circuits such as, for example, an ASIC, an FPGA, a hardware accelerator, and/or the like. In an example embodiment, the processor is configured to execute instructions stored in memory or otherwise accessible to the processor. As such, whether configured by hardware or software methods, or by a combination thereof, the processor 60 may represent an entity capable of performing operations according to embodiments of the present invention while specifically configured accordingly.

In one embodiment, the processor 60 is in communication with or includes memory 62, such as volatile and/or non-volatile memory that stores content, data or the like. For example, the memory may store content transmitted from, and/or received by, the network entity. Also for example, the memory may store software applications, instructions or the like for the processor to perform operations associated with operation of the network entity 16 in accordance with embodiments of the present invention. In particular, the memory may store software applications (e.g., location application 107c), instructions or the like for the processor to perform the operations described above and below with regard to FIG. 4. In one embodiment, the memory stores the database of previously observed wireless fingerprints in association with their respective, predefined geographical locations.

In another embodiment, the location application 107c and or other software applications of the network entity 16 may execute or perform functions based, at least in part, on the wireless fingerprints according to the approach described herein. By way of example, the functions (as described in more detail below) may include, but are not limited to: (1) device pairing based on physical proximity; (2) performing "neighborhood searches"; and/or (3) providing for location-based messaging, including advertising. In some embodiments, the location application 107c may operate in connection with a location client application 107a executing or otherwise resident on the mobile device 10. For example, the location client application 107a may perform all or a portion of the functions described with respect to the location application 107c.

In addition to the memory 62, the processor 60 may also be connected to at least one interface or other means for transmitting and/or receiving data, content or the like. In this regard, the interface(s) can include at least one communication interface 64 or other means for transmitting and/or receiving data, content or the like, such as between the network entity 16 and the mobile device 10 and/or between the network entity and the remainder of network 14.

In order to determine its location in accordance with an example embodiment, a mobile device 10 may identify the wireless signal present at its current geographical location. In order to identify the wireless fingerprint, the mobile device may scan for wireless signals, such as the wireless signals having a predetermined frequency or within a predetermined range of frequencies. In one embodiment, for example, the processor 30 directs the receiver 26 to capture incoming wireless signals with the receiver itself being configured to receive signals having a predefined frequency or within a range of predefined frequencies. In one embodiment in which the access points 12 of a wireless local area network have deployed throughout a building such that the wireless fingerprint will be comprised of the wireless signals emitted by the access points, the mobile device may be configured to detect the wireless signals incident at the mobile device at the operational frequency of the access points. Alternatively, in embodiments in which other types of sources are employed that emit wireless signals at other frequencies, the mobile device may be similarly configured to detect wireless signals at the other frequencies of interest.

The wireless fingerprint that is identified by the mobile device 10 may include the received signal strength or other signal parameter for the wireless signals received from each access point in association with the address, such as the media access control (MAC) address, of each access point. With reference to the embodiment of FIG. 5, for example, four signal sources 12, such as four access points, are positioned throughout a portion of a building. Each access point of this embodiment has a unique address, such as 0xa3b, 0x6d2, 0xbc4, and 0x5fe.

Figure 5:
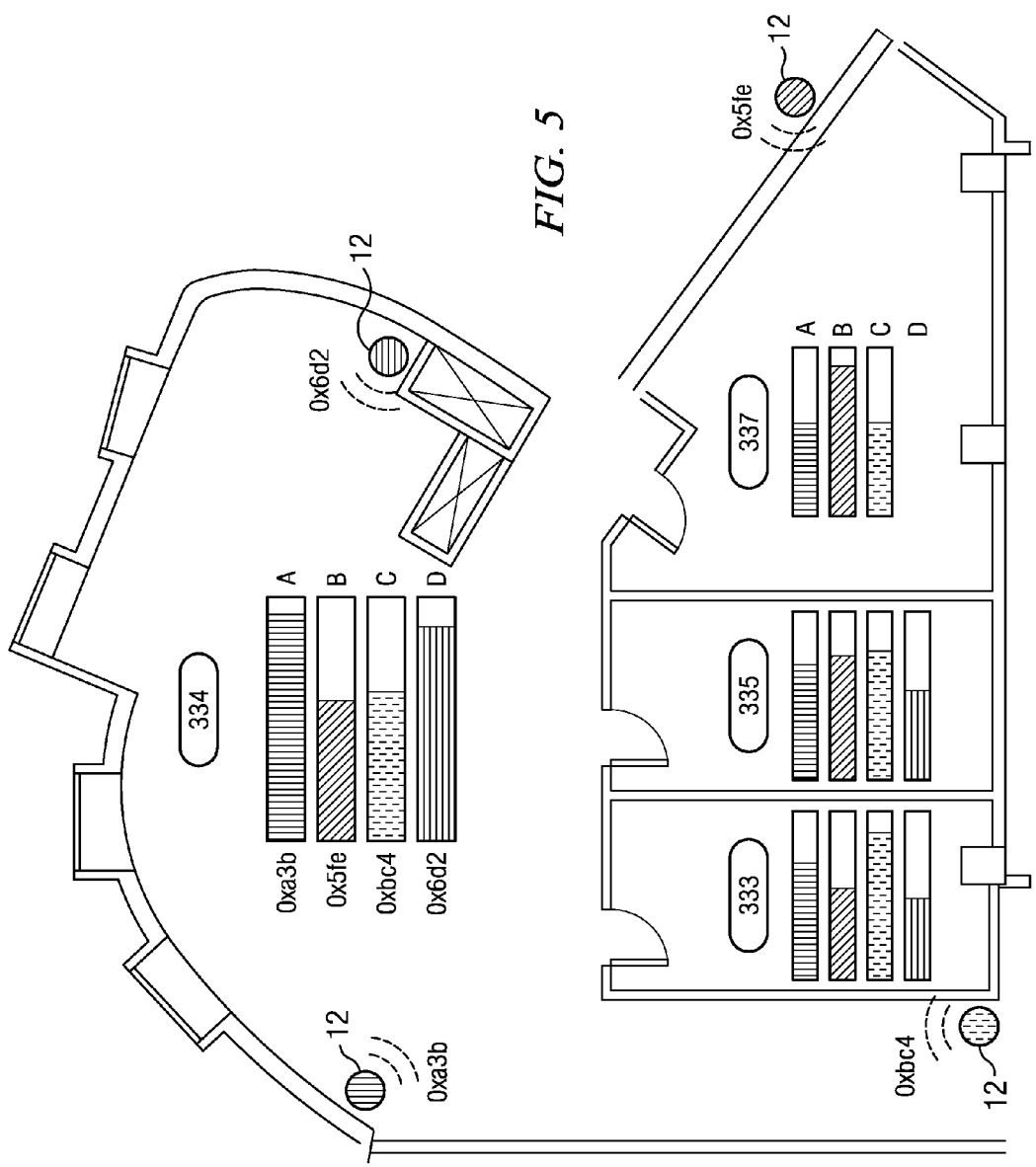
FIG. 5 is a schematic representation of the wireless fingerprints in each of four different spaces.

Because each room or space is differently situated with respect to the signal sources 12, both in terms of distance and in terms of intervening structures, such as walls, doors, windows and the like, the wireless fingerprint received by a mobile device 10 within each space is generally different as shown, for example, in FIG. 5. By associating a particular wireless fingerprint with a specific space, the space in which a mobile device is currently located may be identified by matching the current wireless fingerprint received by the mobile device with the particular wireless fingerprint associated with the space. The first space or region 334 has a fingerprint corresponding to the signal strengths of 0xa3b, 0x5fe, 0xbc4, and 0x6d2, which are identifiers of the four signals available in the illustrated spaces, also identified by (A), (B), (C), and (D) for ease of reference. Each of the signals has a different strength as represented by the corresponding horizontal bars. Each of spaces 333, 335, and 337 also have their own fingerprints with the four signal strengths corresponding to the four signals available. Region 337 shows signal strengths A, B, and C as the strength of signal D is negligible in that particular space. A database of existing wireless fingerprints may be generated through an initial site survey that builds and populates a signal strength map and produces fingerprints of each space. Fingerprints of a particular space may change over time based on reconfiguration, repositioning or replacement of the access points from which the signals are measured for the fingerprints. Additionally, a fingerprint may be altered or revised by using organic user input to augment the database over time. For example, a user that is known to be in a particular space may transmit a fingerprint observed at that space by a user device (e.g., FIG. 3, reference number 10) to a server (e.g., 16), such that the observed fingerprint may replace or augment the fingerprint stored in a database on the server.

In example embodiments of the present invention, the wireless fingerprint may be created using a Weighted Gaussian Distance, or WGD to each access point (AP). Wireless fingerprints benefit from the use of WGD as Weighted Gaussian Distances are relatively simple to compute and provide a general scan distance function. As localization algorithms can be running continuously in the background of mobile devices, the simplicity of WGD computation may translate into longer battery life. Scan distance functions may be useful for clustering scans. Clustering, in turn, may be used for outlier detection and cleaning scan databases. Distance functions may also be useful for estimating the physical distance between the positions where the scans were made as further discussed below.

As such, after identifying the wireless fingerprint present at a particular geographical location, the mobile device 10 and, more specifically, the processor 30 of one embodiment determines whether the current wireless fingerprint corresponds to a previously observed wireless fingerprint associated with a predefined geographical location and, if so, determines the predefined geographical location to be the current location. As such, the current wireless fingerprint identified by the mobile device may be compared to a plurality of previously observed wireless fingerprints, such as maintained in a database, to determine if the requisite correspondence exists. Although the mobile device could transmit a representation of the current wireless fingerprint to a network entity 16 with a request that the server determine whether the current wireless fingerprint corresponds to any previously observed wireless fingerprint stored in a database maintained or otherwise accessible by the network entity, this reliance upon the network entity could undesirably introduce latency. As such, the mobile device, in one embodiment, stores a number of previously observed wireless fingerprints in association with respective predefined geographical locations in local memory, such as volatile memory 50. In this manner, a user device may download a fingerprint archive or database relevant to the building, floor, or geographical region in which the user device is located such that if the user device loses contact with the network (i.e., goes offline), the fingerprint database is still available on the user device for determining the location of the user.

The mobile device 10 may obtain the plurality of previously observed wireless fingerprints in a variety of manners. In one embodiment, a network entity 16 maintains a database, such as in memory 62, of previously observed wireless fingerprints for respective predefined geographical locations for use by a plurality of mobile devices. As such, the mobile device may communicate with the network entity to obtain a potentially relevant subset of the data from the database pairing previously observed wireless fingerprints to respective predefined geographical locations. The potentially relevant subset of data may be defined in various manners, such as a subset that includes all known locations within a building, within a geographical region, or within a building floor among others. The mobile device may limit communication with the network by downloading an archive of known fingerprints that correspond to locations that the user may visit. Optionally, the mobile device may communicate with the network only occasionally, such as when entering or leaving a particular region, or when an observed fingerprint is not found within the archive stored on the mobile device. Such embodiments may reduce network communication that may result in improved network capacity and/or longer battery life for a mobile device. Embodiments may also increase user privacy by maintaining location information only on the user device rather than transmitting the location to a server.

The manner in which a wireless fingerprint represents the signal strength associated with each signal source may take into account the potential of a wireless fingerprint to vary somewhat based upon various parameters. In this regard, although the signal strength of the signals transmitted by each signal source visible within a space may be represented in various manners, the signal strength is represented in one embodiment by its received signal strength indication (RSSI), although other measures may be alternatively employed, such as signal to noise ratio (SNR). The RSSI values may be normalized or scaled so as to lie within a predefined range, such as 0 to 100. For each space and for each signal source visible within the space, the processor 30 of one embodiment constructs a histogram of the number (i.e., count) of signals received within the space from the respective signal source having respective RSSIs.

In example embodiments of the present invention, wireless fingerprints generated through WGD localization may be more easily computed than existing methods of generating wireless fingerprints and they may also require significantly less storage space, such that storing a database of previously observed wireless fingerprints in association with respective predefined geographical locations may be more efficient on devices, such as mobile device 10, with limited memory capacity. To generate a WGD wireless fingerprint, a space-to-access-point histogram may be used, as used in basic wireless fingerprints; however, each of these histograms may be summarized as a single Gaussian. When normalized, each histogram may be summarized with mean $\mu$ and the standard deviation $\sigma$. This may reduce storage and network transmission requirements to the domain of the histogram (typically 0-100 dBm) times the maximal height of the histogram down to two floating point numbers. As such, each space in an environment may be assigned a wireless fingerprint, which may be a set of mappings from access points (AP) to data triples:

$$AP_i \Rightarrow \langle w_i, \mu_i, \sigma_i \rangle$$

where $w_i$ is the weight of $AP_i$, the number of observable APs is $\tau$, and the total weight for each fingerprint is $\Sigma_{i=1}^{\tau} w_i = 1$. The most recent k (number of scans performed) scans of the user may also form a fingerprint using the same method.

Determining the weight w to apply to each visible AP may be an important part of the algorithm. In an example embodiment, a strawman method may be to simply weigh each visible AP equally: $1/\tau$. In an alternative embodiment, the weight may be based on the probability that the given AP will actually be observed in the space. When a space is scanned many times, some APs will be seen in every scan, and some seen only rarely. A user's fingerprint will tend to have the same distribution of APs when it is in the same space: if the user's fingerprint does not contain an AP that is almost always observed when in a particular space, it may be highly unlikely that the user is in the space. Weighing according to scan detection frequency reflects this concept. Specifically, the weight may be:

$$w_i = r_i/R$$

where $r_i$ is the number of readings of $AP_i$ and R is the total number of readings that constitute this fingerprint, $\Sigma_{i=1}^{\tau} r_i = R$. While the term "weight" is used herein with reference to the contribution of an Access Point to an overall fingerprint, the weighting function may be any feature selection function that determines the most relevant Access Points. For example, an access point may include a reliability rating that corresponds to the visibility of the Access Point within a region. That reliability rating may be used as a feature selection function such that only the most reliable Access Points are used to contribute to the fingerprint of a location. An "always-on" Access Point may have a very high reliability rating, while an intermittent Access Point may have a low reliability rating. A feature selection function may generate a value that corresponds to each Access Point and the value may be used for determining the significance of that particular Access Point to the fingerprint of a particular location.

Embodiments of the present invention may provide a method for removing data triples from the fingerprint of a location by removing the data triples that are least significant to the fingerprint. As disclosed above, each data triple has a value that corresponds to the feature selection function as applied to the Access Point. The data triple or plurality of data triples corresponding to the least significant value may be removed from the fingerprint, thereby compressing the fingerprint and permitting more fingerprints to be stored in a smaller amount of memory than would have been possible previously. The least significant value may correspond to the data triple with the lowest weight (lowest observation frequency) or it may be the data triple with the lowest reliability rating. Other measures of significance for the value may be used. Embodiments may also use a threshold for values such that any data triples with values that fall below the threshold may be removed from the fingerprint.

Figure 4:
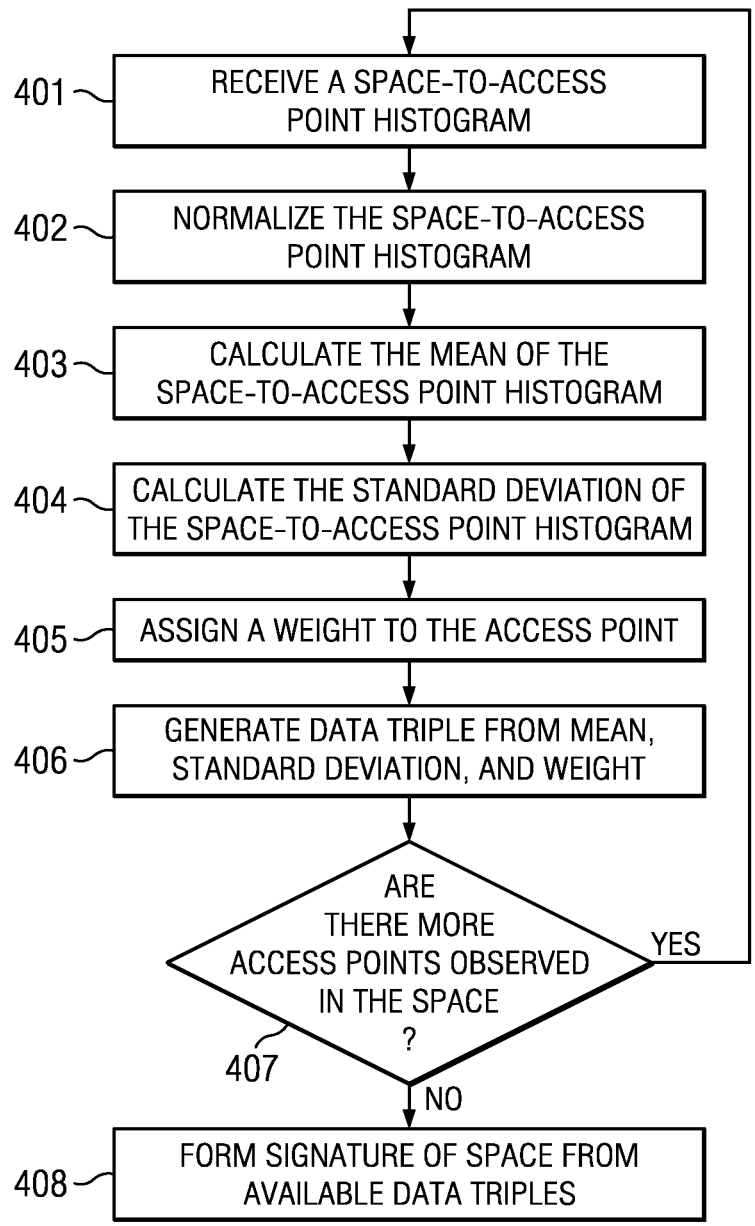
FIG. 4 is a flow chart of the operations performed in accordance with one embodiment of the present invention.

Operations of an example embodiment of a method according to the present invention are illustrated in FIG. 4. A space-to-access point histogram is received at block 401. The histogram is then normalized at block 402. The mean of the histogram may then be calculated at 403. The standard deviation may be calculated at block 404. A weight is assigned to the access point, as described above, at block 405. Together, the weight, mean, and standard deviation form a data triple representing the access point as observed within the space at block 406. If more access points are observed within the space, the process of blocks 401-406 may repeat until there are no further access points. Once all of the access points have been assigned a data triple, the data triples are combined to form a fingerprint of the space at block 408.

Figure 6:
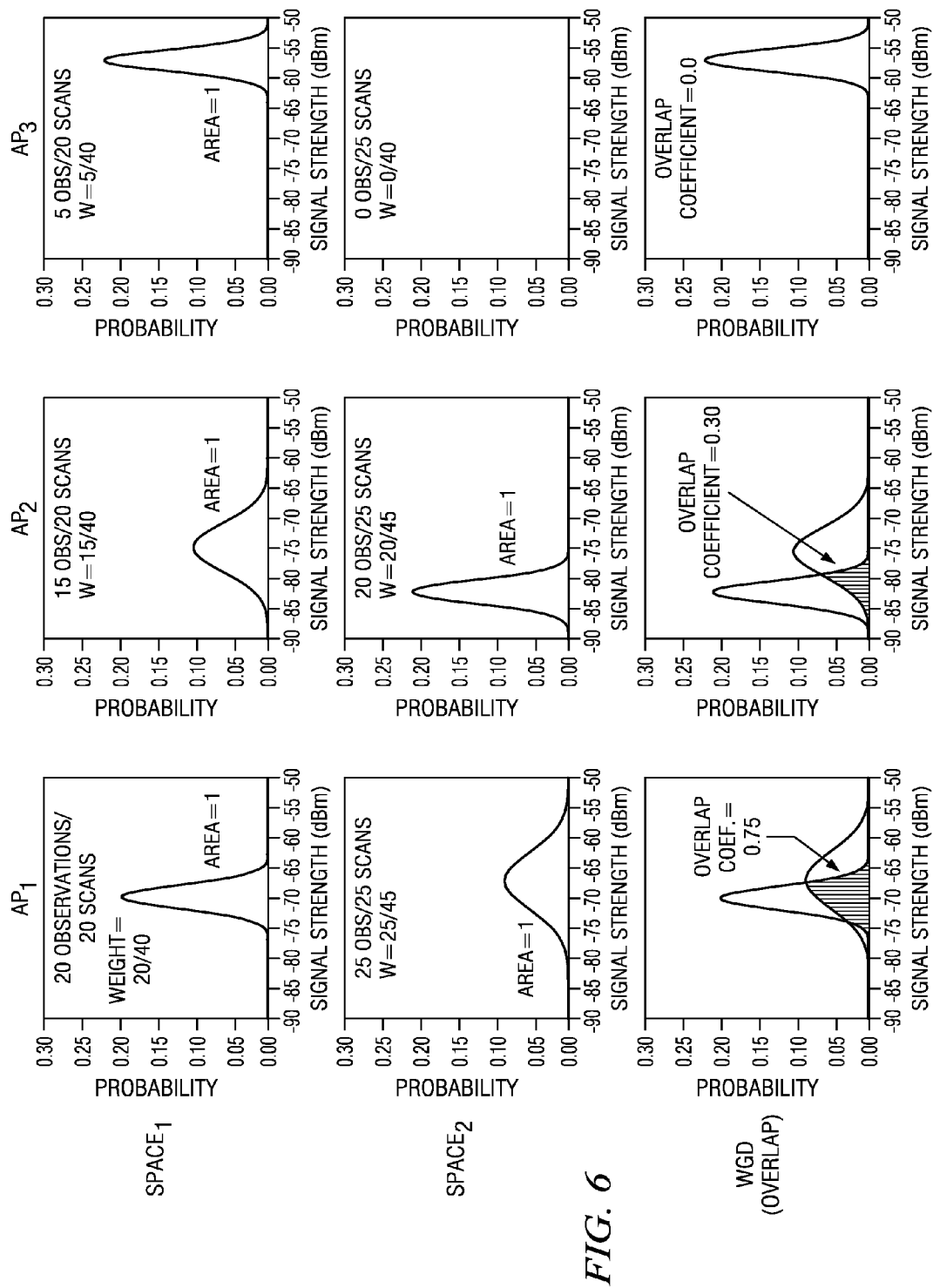
FIG. 6 is an illustration of some example signal strength vs. probability plots of a Weighted Gaussian Method according to an example embodiment of the present invention.

To find the distance between two fingerprints, the similarity in signal strengths of APs that exist in both fingerprints may be determined, while penalizing for missing APs. These calculations may be performed, for example by the processor 60. The comparison of any two fingerprints may return a distance metric $-1 \le s \le 1$, where a comparison of identical fingerprints returns a value of 1 and a comparison of disjointed fingerprints returns a distance metric of $-1$. Disjointed fingerprints are those that share no access points. For fingerprints A and B, the effect $\delta$ of each AP i is:

$$\delta \begin{cases} \frac{w_a + w_b}{2} \times O(\mu_a, \sigma_a, \mu_b, \sigma_b) & \text{if } i \in A, i \in B, \\ -\frac{w_a}{2} & \text{if } i \in A, i \notin B, \\ -\frac{w_b}{2} & \text{if } i \notin A, i \in B \end{cases}$$

Where O( ) is the overlap coefficient between the two Gaussian distributions. The total distance is the sum of each $\delta$. FIG. 6 illustrates an example embodiment of computing the distance between a pair of fingerprints. In the illustrated embodiment, twenty scans in Space$_1$ have observed three different access points (AP$_1$, AP$_2$, and AP$_3$). The 25 scans in Space$_2$ have observed two different access points, two of which are the same as those seen in Space$_1$: AP$_1$, AP$_2$. AP$_3$ was not observed in Space$_2$. To compute the weights for Space$_1$, the observations for each AP are divided by the total number of observations: 20+15+5=40. The same row illustrates how the distance between the two fingerprints for Spaces 1 and 2 is computed:

$$s = 0.75 \times \frac{\frac{20}{40} + \frac{25}{45}}{2} + 0.30 \times \frac{\frac{15}{40} + \frac{20}{45}}{2} - \frac{5}{40}$$

"Space$_2$" could equivalently be a set of scans as seen by an end-user's device: the algorithm to compute their score would overlap the same. Since there is a correlation between physical distance and fingerprint distance, an end-user's distance to a particular space may be calculated by the known fingerprint of the space and the presently-seen fingerprint of the end-user's device, even if that presently-seen fingerprint does not correspond to a known space.

While the overlap computation exists as a closed-form function, the results from the function may be stored in a look-up table in, for example, the memory 62 or 50. In contrast, a Bayesian computation may require thousands of iterations to converge on a space. It is noted that the same comparison may be applied to a user's fingerprint or any collection of scans.

When only a single RSSI value exists for an AP, this value may become the mean $\mu$. As this situation may typically exist for low probability APs, taking more scans may not be advisable as the number of scans required to achieve a stable $\sigma$ may be relatively high. To estimate $\sigma$ for such low reading APs, a weighted average of the APs $\sigma$ (if it exists) together with an empirically observed $\sigma_g$ may be used:

$$\frac{(r_i - 1)\sigma_i + \sigma_g}{r_i}$$

With this, an expected overlap may be computed even with very few RSSI values, or even a single RSSI value, from a given AP. In some embodiments, $\sigma_g=1$ has been shown to work well.

Note that the selection of a Gaussian function may be orthogonal to the method. While RSSI distributions may follow a Gaussian and may often be summarized with one, any normalizing function that fits the data may also work. In particular, spaces may have their own individual functions (e.g., Beta distribution), which may occasionally fit RSSI data better. A potential negative effect to selecting a different function may be that the overlap computation (determining the overlap coefficient) may be more computationally expensive—in contrast to the closed-form function that the Gaussians permit. Variations on the weighting function may also be possible. For example, not dividing by two when an AP is missing. This may serve to penalize missing APs more and, consequently increase the domain of s to −2.

Figure 7:
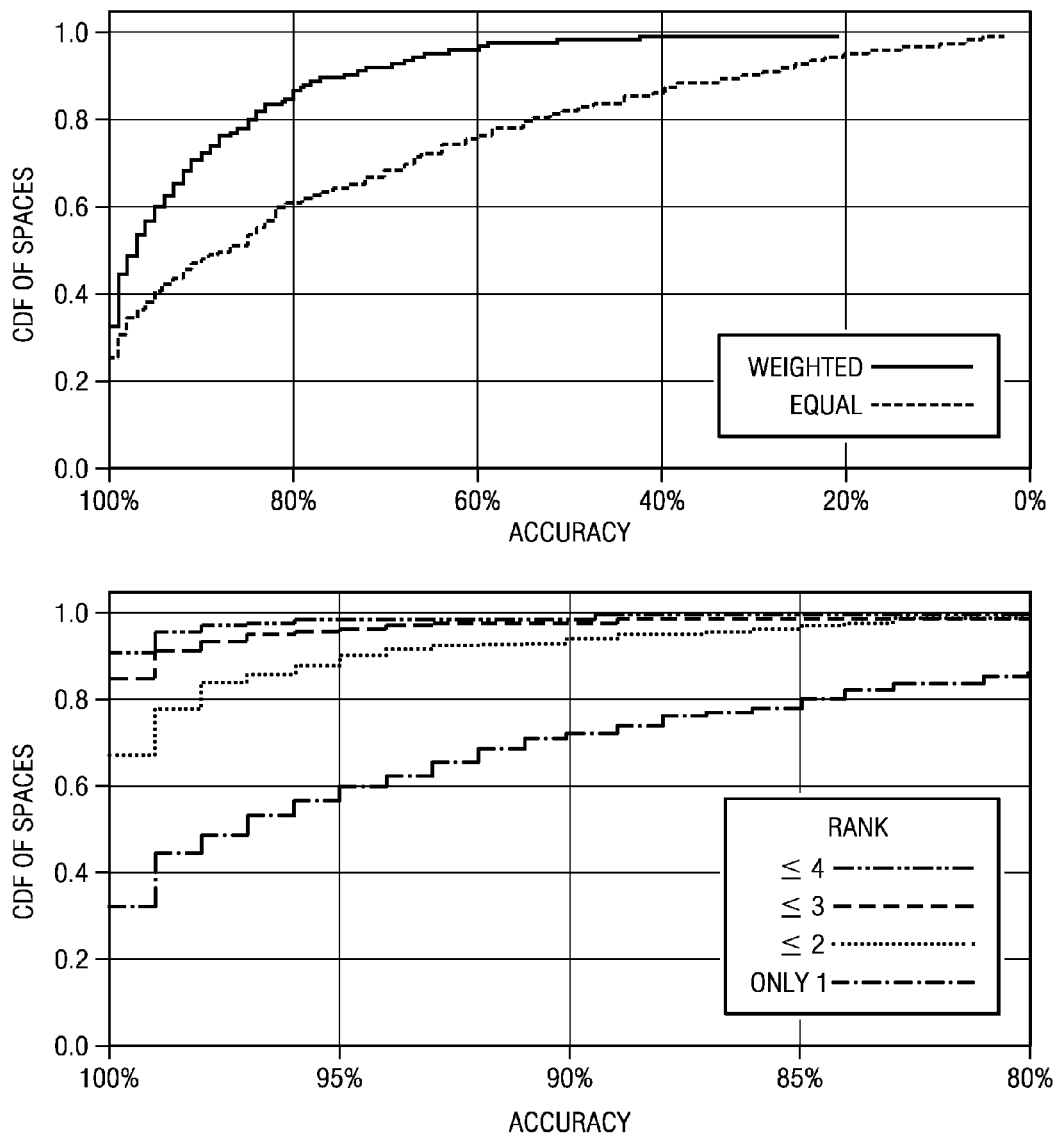
FIG. 7 are plots of the results of an example simulation of a Weighted Gaussian Method according to an example embodiment of the present invention.

FIG. 7 illustrates the effect of weighing according to scan frequency as compared to weighing each AP equally, i.e., setting $$w = \frac{1}{\tau}$$

through simulation results according to an example embodiment of the present invention. While other refinements may exist, such as weighing according to the maximum RSSI value seen for the given AP, some level of reasonable weighting is more accurate than valuing all APs equally. When the weighting functionality is switched off and all RF sources are counted equally, accuracy is reduced.

As noted above, wireless fingerprints of existing embodiments of localization systems may usurp large amounts of memory. Due to limited memory constraints on many mobile devices 10, near-constant network connectivity may be required to keep the cache of available wireless fingerprints up-to-date and prevent the information from becoming stale. A system using Bayesian positioning $w_i$ may be substituted by the WGD localization method.

In environments that are dense with RF sources, such as urban environments, the wireless fingerprint for a single space can contain dozens or hundreds of WGD triples, $AP_i \Rightarrow \langle w_i, \mu_i, \sigma_i \rangle$, as there may be dozens or hundreds of APs observed in any given space. As discussed above, using the weights of the Gaussian distance method, it is observed that not all of these RF sources supply the same amount of information. Most RF sources do little to differentiate one space from another. Rather, the extra RF sources are extraneous and may be discarded during the fingerprint generation process. For illustrative purposes, assume all raw scans (<RSSI, position> pairs) are available at a server, for example 16, and that the goal of the server's fingerprint generation process may be to create a set of signal map archives that may be sent to, or downloaded by a client.

While other methods for selection of the top-k number of AP sources exist, using the highest-weighted ones is a simple method that works well in practice. Thus, a WGD fingerprint produced according to embodiments of the present invention can be reduced from dozens or hundreds of RF sources to k (e.g., 5). As this list of sources constitutes the build of a signal map archive, the method may reduce the size of an archive by approximately an order of magnitude.

In example embodiments, the floating point numbers that make up the fingerprint may be represented by only a few (e.g., 7) bits without degradation in accuracy (giving each 128 possibilities). For example, the range of the mean only needs to extend from 0 to −100 dBm (at most), or could be represented as a base (for example, 20 dBm) plus an offset at 0.5 intervals up to 84. The range of the standard deviation may typically be less than 10 dBm. Thus, even 0.1 increments or increments of expanding size (more detailed toward 0) would fit into seven bits. Assuming each number was originally stored in 32 bits, the fingerprint length may be reduced to at most one quarter of the original size. All three components of the WGD fingerprint are reducible. For particular physical sites, it may be feasible to reduce the size further. Such an optimization may reduce archive sizes by half an order of magnitude on average.

A signal map archive that may use this compression method of example embodiments of the invention may have three main sections: a header, a space description, and a fingerprint map. Note that the archive may also include bounding polygons for each space. Further, a converter may serialize an XML version of the archive in the described format.

TABLE 1

Fingerprint Archive Header

| Field | Description |
|---|---|
| Name | Signal Map Title |
| Version | Version Number |
| GPS | Absolute coordinate; space offsets relative to this coordinate |
| #spaces | Total count of spaces in map |

TABLE 2

Fingerprint Archive Space Descriptions. Map universal space IDs to IDs local to archive. Bounding area may also be included.

| Field Name | Univ. Space ID | Space ID | Canonical Name | Offset Coordinate (x, y, z) |
|---|---|---|---|---|
| Size (bits) | 64 | 16 | — | — |

TABLE 3

Fingerprint Archive Body. List spaces and per-space fingerprints associated with this access point.

| | Field Name | | | | | |
|---|---|---|---|---|---|---|
| AP ID | # spaces | Space $ID_1$ | Weight | Mean | Std. Dev. | Space $ID_2$ |
| Size (bits) | 48 | 7 | 16 | 7 | 7 | 7 | 16 |

TABLE 4

Alternative Fingerprint Archive Body. Store compressed fingerprint directly after each space ID (or space identification).

| | Field Name | | | | | |
|---|---|---|---|---|---|---|
| Space ID | AP $ID_1$ | AP $ID_1$ | Weight | Mean | Std. Dev. | AP $ID_2$ |
| Size (bits) | 16 | 16 | 7 | 7 | 7 | 16 | 16 |

Together with each space ID are e.g., $k = 5 \times \langle AP_i, w_i, \mu_i, \sigma_i \rangle$.

This alternative may result in improved on-demand performance depending upon implementation. It may also require mapping from the $2^{48}$ AP space to a unique ID, which may be sixteen bits or smaller depending on the number of APs in the archive (shown here as 16 bits).

Figure 8:
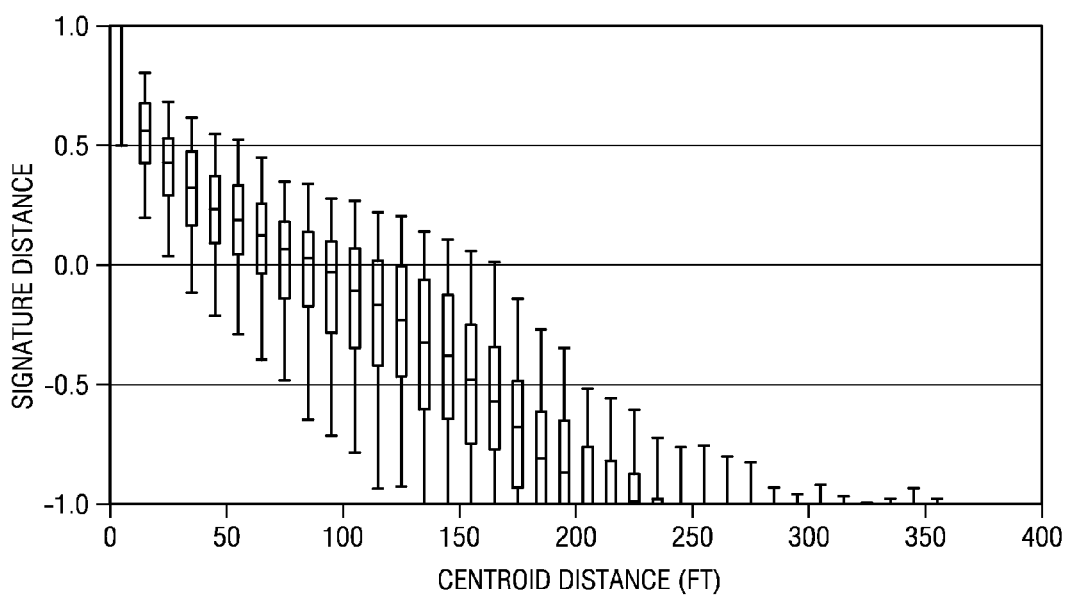
FIG. 8 is a plot of the results of an example simulation of a Weighted Gaussian Method according to an example embodiment of the present invention.

Using WGD and other radio frequency (RF) fingerprint-based localization methods as described herein may provide a relatively easy method for estimating the physical distance between two (or more) devices. This method may not require a near field communication channel or short-range proximity sensor such as Bluetooth. FIG. 8 illustrates the correlation between physical distance and fingerprint distance. Data collected through testing and simulation illustrates that WGD and other functions that compute a distance metric on RF scans or fingerprints can infer the physical distance between where those scans were taken, particularly when the physical distances are close. As illustrated in FIG. 8, there is a strong correlation between fingerprint distance and physical distance, particularly when spaces are nearby to one another. Space distance is measured as centroid-to-centroid using test data. Fingerprint distance is computed using WGD. The top and bottom whiskers in the plot show the top 5% and bottom 5% respectively. The boxplot lines represent the $25^{th}$, $50^{th}$, and $75^{th}$ percentiles.

An example embodiment of the use for this physical distance estimation may be a device pairing system. The system may require two mobile devices (e.g., FIG. 3, reference number 10) to be in the same room to exchange data and compare their physical distance. For example, spaces with a fingerprint distance greater than 0.5 are likely to be less than 100 feet apart. The system may only allow the pairing to occur if the RF fingerprint distance is below a certain threshold. Moreover, this pairing could be combined with a haptic action or device movement by the device holders that signaled to the system that two or more devices should temporarily be permitted to share data (e.g., the devices could be shaken or "bumped" as detected by an accelerometer). Determining that the two (or more) devices are approximately in the same physical location could take place at a server or on the devices themselves if they are connected by a communication channel. The pairing may occur with any device that can form an RF fingerprint (e.g. a mobile phone, laptop, stationary device with a wireless card, or any of the aforementioned devices). After the pairing has occurred, the devices may continue to exchange data when they are not in the same physical location depending upon the application.

A further example embodiment of the physical distance estimation may be used for a user device to conduct a "neighbor search" in a location to determine a group of devices that are near to the user device performing the "neighbor search." The user device may not need to know the physical location of neighboring devices, but awareness of their proximity may be beneficial. Neighbor-to-neighbor communication within a localization system may also permit a first device to provide a correct location to a second device within the same space if the first device has a high-confidence of its own present location. This could further be used in conjunction with a physical distance estimation to provide a more exact location of the second device with respect to the first device.

This RF-level proximity detection has a few advantages over other methods, such as Bluetooth. For example, an application may take advantage of the RF scanning that is already on-going such that Bluetooth or a similar protocol does not need to be switched on or off. Also, it may allow a larger number of devices to be associated with one another. As the comparison is happening at the signal level and is essentially a bounded nearest neighbor search, extending from two paired devices to many is straightforward. Further, computing the device proximity at a remote server may have security advantages, such as faking the current set of RSSI values and APs seen may be difficult for someone trying to "hack" into the communication.

Another example embodiment of the physical distance estimation may be used for posting virtual location-based messages at indoor and outdoor locations. The distance estimation method can be advantageous for indoor use where GPS or cellular network based systems may not be reliably available or available at all and may also be useful in urban canyons or otherwise when the satellites required for GPS are obscured or unavailable. The method can be utilized with a wireless local area network such as WLAN based on IEEE standard 802.11 and/or cellular towers utilizing GSM, CDMA, WCDMA signaling and/or the like. For example, the distance estimation may be used to determine when a device 10 is within proximity of a predefined location associated with a virtual note. Based on this determination, the device 10 can receive or otherwise be alerted of the virtual note at the location.

Figure 11:
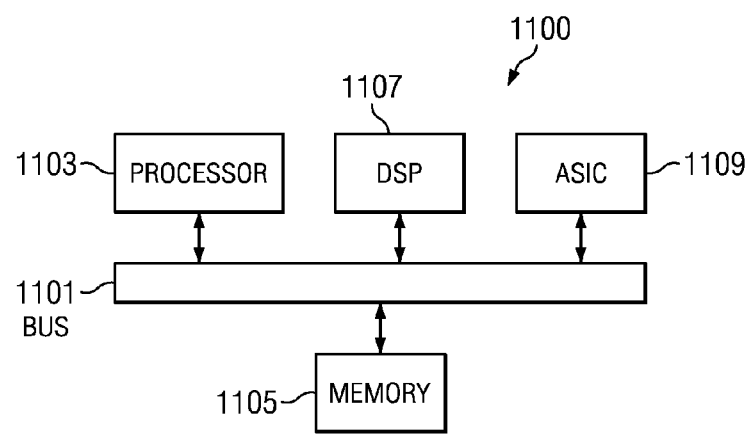
FIG. 11 is a diagram of a chip set that can be used to implement an embodiment of the invention.

FIG. 9 is a flowchart of a process for setting up one or more virtual messages and for retrieving one or more virtual messages, according to one embodiment. In one embodiment, the location application 107c residing in the network entity 16 performs the process 900 and is implemented in, for instance, a chip set including a processor and a memory as shown in FIG. 11. In addition or alternatively, the location application 107a residing in the mobile device 10 may perform all or a portion of the process 900. In step 901, the location application 107c determines to associate one or more virtual messages with a user RF signature/fingerprint and/or a geographical location. By way of example, the one or more virtual messages provide message content and/or describe a geographic location of one or more message providers (e.g., a business or a colleague) close to the user's geographic location. At step 903, the location application 107c detects one or more RF signatures/fingerprints of respective devices of one or more visiting users.

At step 905, the location application 107c determines location information associated with the respective mobile devices 10 (e.g., smart phones) of the one or more users. By way of example, the location determination can be accomplished by comparing RF signatures/fingerprints at a given geographical location. For example, Jim may select to post a virtual message (e.g., I am in the lab) at/near his office location so his colleagues would receive a notification when they are close to Jim's office.

At step 907, the location application 107c observes a database of RF signatures/fingerprints associated with a location and compares the two locations for a match. For example, the database can list known geographical locations matched with know RF signatures/fingerprints. The location application 107c can then utilize the geographical locations for comparison instead of utilizing the RF signatures/fingerprints. In another embodiment, the matching process can be performed at a device, such as a mobile phone or a laptop computer, where the location application has access to a set of notifications and displays them to the user when within a specified range.

Figure 10:
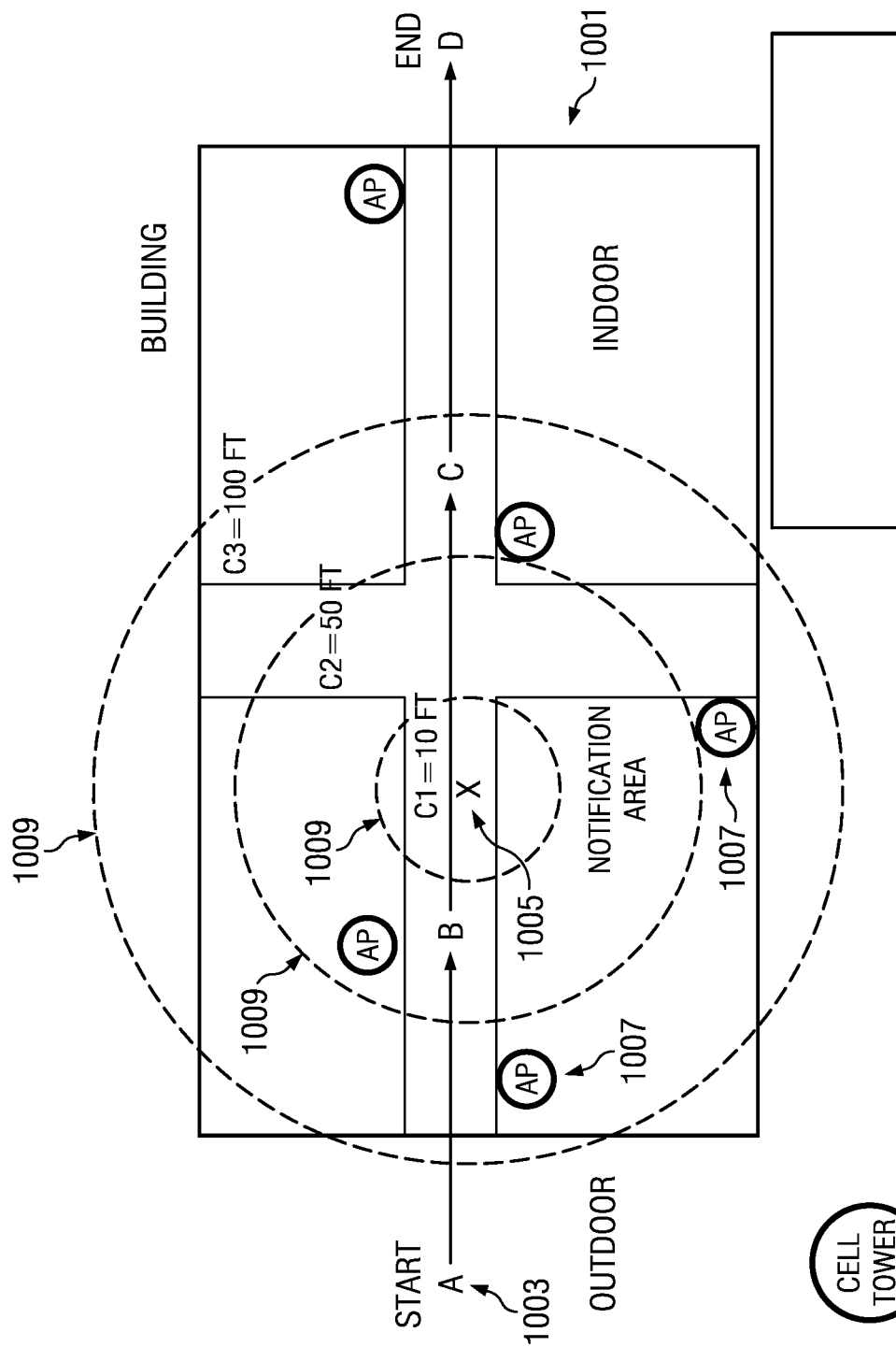
FIG. 10 is a diagram of a portion of a building illustrating an indoor coverage/notification area, according to one embodiment.

At step 909, the location application 107c determines whether the one or more users are within a predetermined radius of the geographic location such as in FIG. 10. In one embodiment, the location application 107c varies the predetermined radius of the geographic location based upon characteristics of the one or more virtual messages, characteristics of the geographic location, or a combination thereof. For example, in FIG. 10, before, during, or after receiving radius setting requests from the message provider and/or the visiting user, the location application 107c can suggest different settings for the provider or the visiting user to consider. By way of example, the location application 107c can suggest to post advertising information (e.g., a sale notification) so as to trigger a notification only within a relatively limited radius (e.g., 25 feet) from the store to reduce potential signal interference and/or to prevent the respective mobile devices 10 from being overly burdened with marketing information. As another example, the predetermined radius for a person-to-person message left in an office area may be set as 200 feet so that the recipient can get notifications of the message before reaching a meeting room. In another embodiment, when there are location-based messages left at two or more spots within the same locations (e.g., a candy shop, and a jewelry store), the location application 107c displays two icons on the map when the user zooms in to a deeper level. The location application 107c can set different radiuses for different messages. For example, the predetermined radius for the message related to a box of chocolates may be 5 feet away from the candy shop in the department store, and the predetermined radius for transactions related to a message in the jewelry store may be 50 feet. Therefore, the user will get the notification of transactions at the jewelry store at a longer distance than transactions at the candy shop.

At step 911, if the one or more visiting users are within the predetermined radius, then the process proceeds to step 913, otherwise, the process ends. At step 913, the location application 107c determines whether the one or more visiting users have access rights to the one or more messages. In one embodiment, besides having location-based access rights, there can be other access restrictions on a given message. For example, Jim posts a virtual message near his office (e.g., I'm in a meeting). His colleagues may access only partial information such as meeting time, but his secretary may access all information such as meeting time, meeting place, meeting topic, etc. At step 915, if the visiting users have access rights, the one or more messages are transmitted to the one or more visiting users (at step 917); otherwise, the process ends.

FIG. 10 further illustrates an example embodiment of the physical distance estimation used for posting virtual location-based messages at an indoor location. Indicator 1001 shows an indoor portion of a building such as a shopping mall, office building and/or the like. One or more visiting users enter the indoor portion of the building at indicator 1003 where the path can be point A through point C. Indicator 1005 shows a user, such as a shop owner at a mall or a colleague at an office setting. There can be multiple wireless access points, AP, indicated by 1007 which the one or more visiting users can receive signals from. A predetermined coverage area/radius, indicated by 1009, can be set by the user. The predetermined coverage area/radius shows where the visiting user can receive the one or more virtual messages. The coverage area/radius can be determined by the user specifying a location criteria/parameter, such as C, to indicate the coverage/radius. For example, criteria/parameter C1 indicates a 10 foot radius and a parameter C3 indicates a 100 foot radius for the coverage area.

Figure 12A:
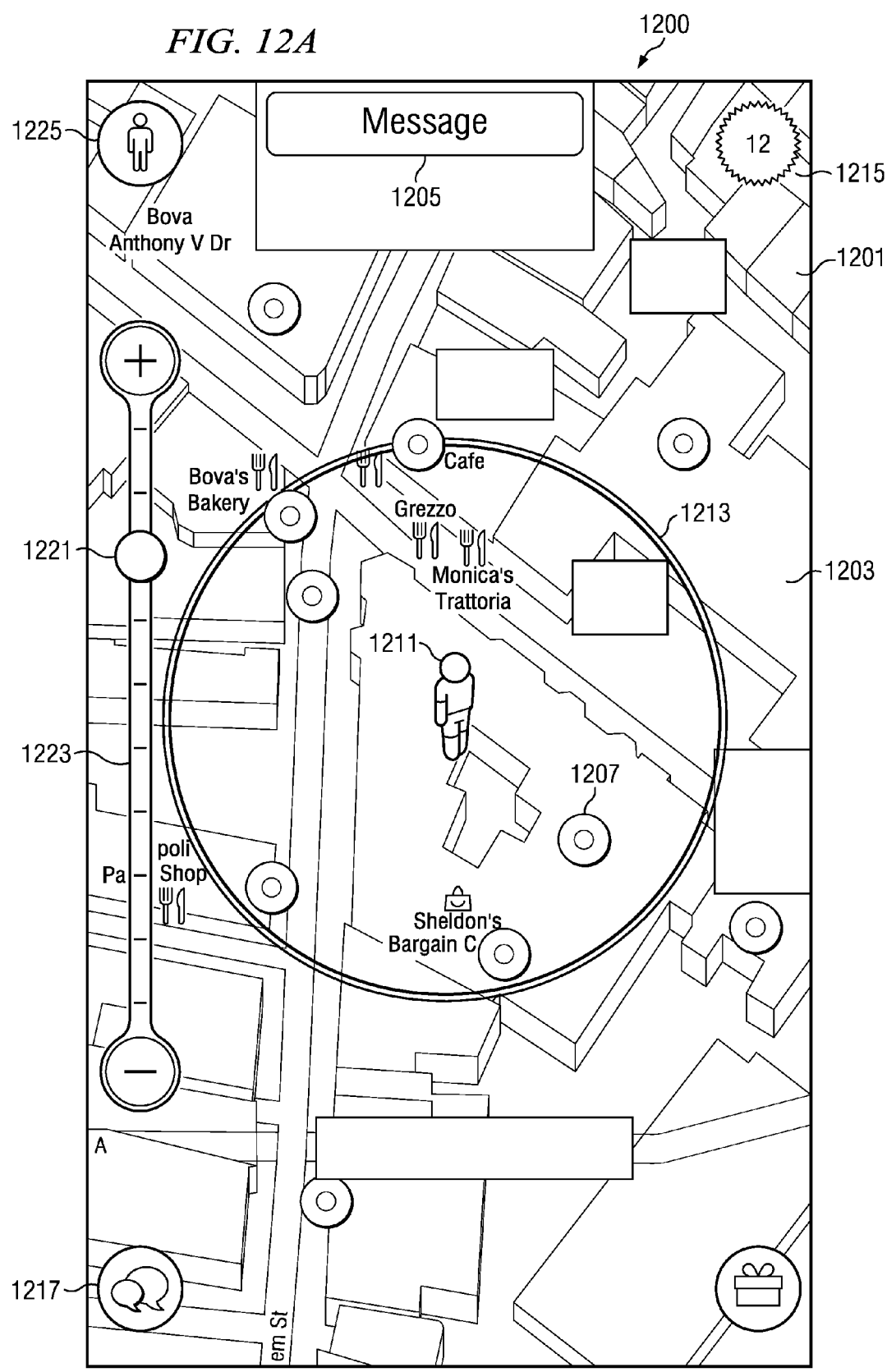
FIGS. 12A-12C are diagrams of user interfaces utilized in the process of FIG. 9, according to various embodiments.
Figure 12B:
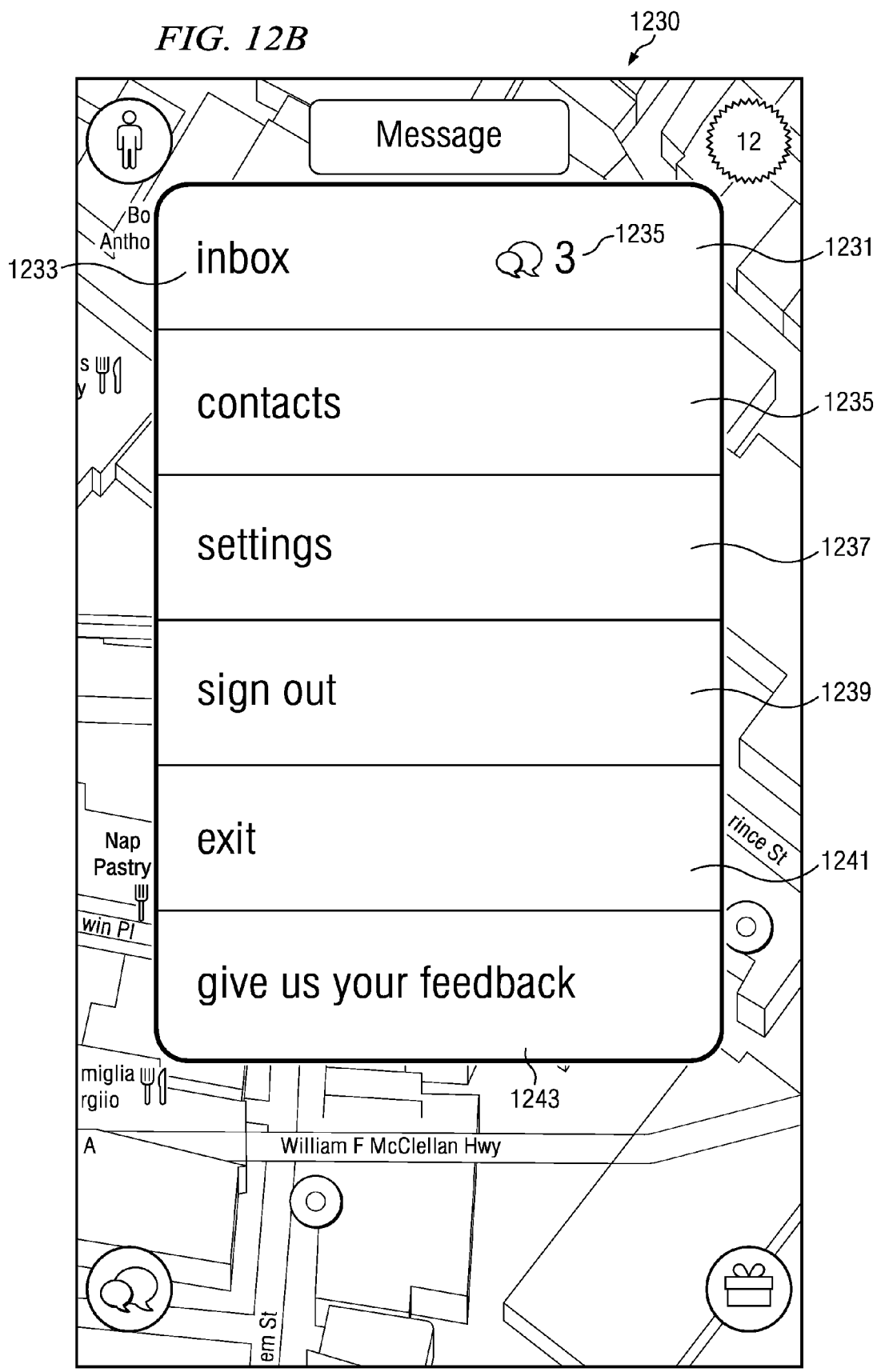
Figure 12C:

FIGS. 12A-12C are diagrams of user interfaces utilized in the process of FIG. 9 according to various embodiments. The visiting user may browse a web page of the system 100 via its Uniform Resource Identifier (URI), a Uniform Resource Locator (URL), pointer, etc. The user then registers with the system 100 to reach a user interface 1200 of FIG. 12A and set up a user ID and a password. After the registration, the user reaches a main screen 1201. By way of example, the main screen 1201 can include a map 1203 of the indoor area (such as a shopping area or an office area, if available) as a background and an icon "Message" 1205 on the top. By selecting (e.g., touching, clicking, etc.) the "Message" icon 1205, a log-in screen pops up for the user to enter an ID and a password. Once the user has logged in the system 100 with the user ID and the password, markers (e.g., icons) of message notifications 1207 show up on the map 1203. In another embodiment, the map 1203 is not available prior to user login.

In one embodiment, the markers for message notifications 1207 are presented with different colors according to their status. By way of example, a filled red circle with its center blank represents a message posted to the user—unread," i.e., available to be read in the My Inbox of the user. A filled red circle represents a message "posted to the user—unread," i.e., blocked post the user can read in my Inbox. A grey circle represents a message "posted to the user—read." The user can tap on a post icon to open up a dialog box. After closing the dialog box, if the post is unblocked to be read, it becomes already read on the map 1203. An orange circle represents a message "posted by the user." In another embodiment, the read or unread messages posted by the user may have different representations.

A human-shaped avatar 1211 represents the user and showing the user's current location on the map 1203. A circle is also shown on the map 1203 indicating a limited notification radius 1213 (as defined by the system and/or the user criteria/parameter) that the user can receive a notification of message and/or to read messages therein. An Inbox Notifications icon 1215 shows how many new messages are in My Inbox, regardless of the user's notification radius or map zoom level.

When the system 100 is launched at the UE 101a, the RF signature/fingerprint positioning system searches for the user's current location. When the location client application 107a is launched, the map shows a previous user location while searching for the current user location. A black and white avatar is shown to inform the user that the previous location rather than the current location is displayed, while no reading radius is shown. While the search is running, the user can browse the map and explore the location client application 107a. If the user taps on a "my location" icon, the map is led back to the previous location when the current location is not yet found.

A "Leave a message" icon 1217 is available for the user to select to trigger the relevant functions. The user can tap on the "Leave a message" icon 1217 to leave a message at the selected location. In another embodiment, the user can press a point on the map 1203 for a predetermined time period (e.g., 15 seconds) to open up a dialog box over the map 1203 to post a message (e.g., involving a post) inside or outside of the notification radius.

A default zoom tab 1221 of the map can be set by the system and/or the user to show the whole "notification radius" 1213 within the screen. In another embodiment, the default zoom tab 1221 is varied according to the nature of the user's point of interest. The notification radius may be set as 50 feet when the user is shopping in a mall or in office building, so the user can see all the messages posted in/by different stores/vendors in the mall. The notification radius may be set as 5 feet when the user is shopping in a book store, so the user can see all the messages posted on different shelves in the bookstore.

A Zoom control bar 1223 "floats" over the map 1203. Not all of the messages shown in the current zoom level of the map can be read. Some of them were notified to the user and saved in My Inbox when the user was in the notification radius last time, but the user did not read the message. In other words, any posted message once found by the system within the notification radius goes into the Inbox and stays there; even those the user "ignores" (i.e., notified previously but not read). Therefore, there are posts not within the current notification radius are available to be read in the Inbox. For the other ones unread, if the user taps on them, a specific message will be shown but the message of the post won't be opened. In this case, the user can read the notification outside of the notification radius, but cannot read a message outside of the notification radius.

The user can freely browse the map by selecting and moving a "Drag the map" icon. If the user browses the map and navigates the view outside of the current location and/or the notification radius 1213, the user can selects a "My location" icon 1225 to lead the avatar 1211 back to the current location and/or in the notification radius 1213.

The user can select the icon "Message" 1205 to call out an Options Menu as shown in FIG. 12B. FIG. 12B shows on a user interface 1230 an Options Menu 1231 includes taps of Inbox 1233, Contacts 1235, Settings 1237, Sign out 1239, Exit 1241, and "Give us your feedback" 1243. The Inbox tap 1233 is shown with a message icon 1235 with message count number (e.g., 3). In other words, the user has three messages in the Inbox, which lists all users' posts (e.g., messages), read or unread.

The user can tap on any icon on the screen to open a new dialog box concurrently with or in place of an existing dialog box, depending upon the settings. When the user selects a post icon on the map, a post reading dialog box 1251 is called out as shown in FIG. 12C. FIG. 12C shows on a user interface 1250 the post reading dialog box 1251. By way of example, a sender ID (e.g., a name, photo, etc.) 1253, a sender's address/venue 1255 (e.g., store 2A-4), media attachments 1257 (e.g., 2 photos), a message 1259 are displayed in the post reading dialog box 1251.

The media files attached to the message can be opened by selecting the music and photo icons. In one embodiment, the message 1259 has a length limitation (e.g., 140 characters maximum). In another embodiment, the post reading dialog box 1251 displays only a portion of the message 1259 that is within the length limitation.

The setting of the message recipient information may be set by the system 100 and/or the user. For example, message time information rules are set to show per minute within the first hour (1 minute ago-until 59 minutes ago), per hour within the first day (1 hour ago-until 23 hours ago, as yesterday after the first day, and as moth/day/year (e.g., Jun. 13, 2010) after the first two days. Message recipient information rules are set to show the number of recipients other than me (e.g., to me and five others, to me and another one, etc).

The user interface 1250 also shows a "previous" icon 1265 and a "next" icon 1267 to enable the users to browse the received items by sender, by age, by proximity, or by other condition or priority set by the system and/or the user, with respect to the currently read post. By way of example, the order of the posts is conditioned upon their proximity to the current location of the user or the location of the currently read post. In other words, the next post is the closest unopened post to the current user location or to the currently read post. When the user opens a first post, the "previous" icon 1265 is unavailable, and when the user opens a second post, the "previous" icon 1265 becomes available. When the user opens the last post on the map, the "next" icon 1267 becomes unavailable. The "next" and "previous" icons 1265, 1267 only appear when there are at least two posts (e.g., messages/gifts) on the map.

Figure 13A:
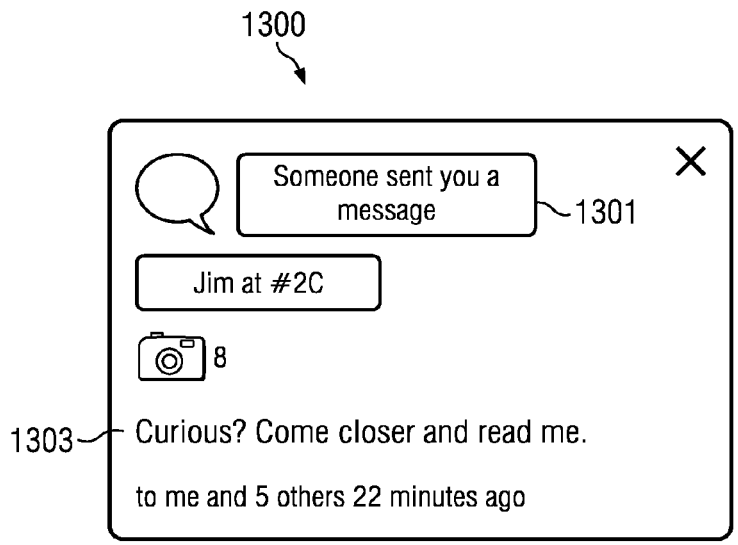
FIGS. 13A and 13B are diagrams of dialog boxes utilized in the processes of FIG. 9, according to various embodiments.
Figure 13B:
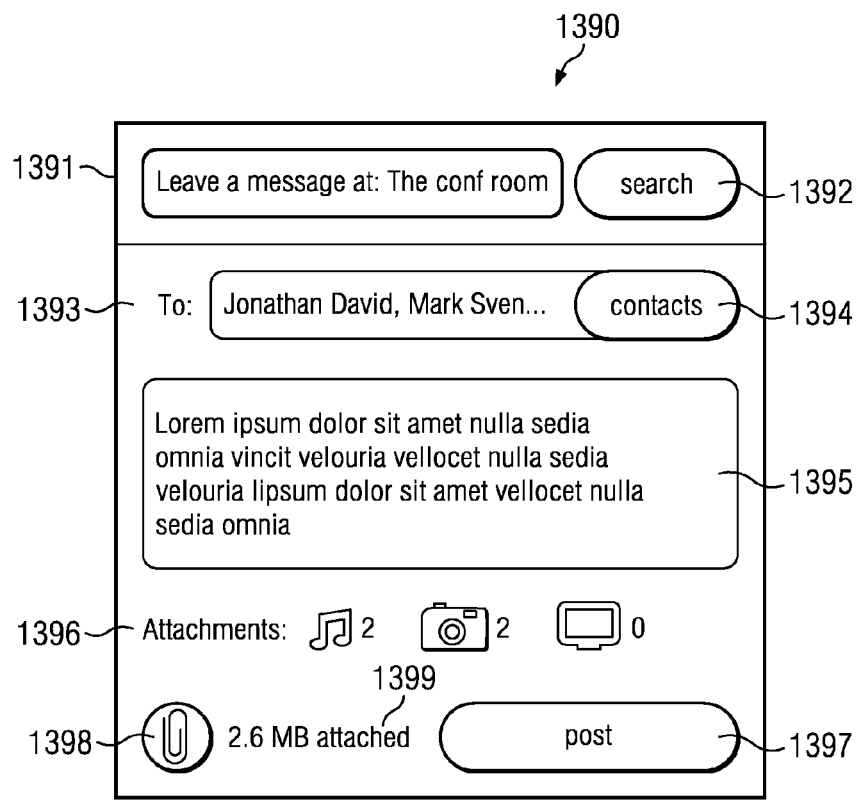

FIGS. 13A and 13B are diagrams of dialog boxes utilized in the processes of FIG. 9, according to various embodiments. The dialog boxes can be shown on the map 1203 of FIG. 12 or on top of other applications when the system 100 is running in the background.

When the user cannot or does not want to read a post at its first arrival at the mobile device 10, the post is recorded in the system 100 and shown on the map in a special dialog box as shown in FIG. 13A when the user subsequently visits the neighborhood. FIG. 13A shows a post reminder dialog box 1300 with a header 1301 "Someone sent you a message". Different messages can be shown in the post reminder dialog box 1300 according to the posting time. For example, if the posting time is within one week, the message of "Curious? Come closer and read me" is shown in the dialog box 1300. If the posting time is one week old or older, the message of "I'm getting old and feeling so lonely here. Come closer and read me" is shown in the dialog box 1300.

By analogy, the user can leave a message to the sender at Mangos or another location. A leave a leaving post dialog box 1390 is shown in FIG. 13B with a header "Leave a post at:" 1391. The leaving post dialog box 1390 can be triggered by selecting the "Leave a post" icon 1217 shown in FIG. 12A. A Search icon 1392 is provided for the user to retrieve another location than the current location as a location for posting the message. The system 100 can search in a local or external database for the location. The local database may be the user's calendar, contacts, email box that contain location information. The external database may be a social network website, a navigation website and/or the like that contain location information. By way of example, the user can retrieve sender's birthday party address from an email or from an electronic invitation, and set that address to leave a message. As a result, "The conference room" is shown after the header 1391. Alternatively, the user can type in the sender's birthday party address to leave a message.

As another example, after the message, the user can send another message at the birthday party address to one or more other contacts in a recipient entry 1393 by selecting contact names (e.g., Jonathan David, Mark Sven . . . ) from a contact screen called through a Contacts icon 1394. The user can enter a message 1395, attached media files 1396 to the message (e.g., two songs, two photos, and no video), and select a Post icon 1397 to leave the messages. The leaving post dialog box 1390 further displays an Attachment icon 1398 for the user to trigger the media file attaching function, as well as an entry 1399 showing a total size of the attached files (e.g., 2.6 MB).

As described above, FIGS. 4 and 9 are flowcharts of apparatuses, methods and program products according to some exemplary embodiments of the invention. It will be understood that each block of the flowcharts, and combinations of blocks in the flowcharts, can be implemented by various means, such as hardware, firmware, and/or computer program product including one or more computer program instructions. For example, one or more of the procedures described above may be embodied by computer program instructions. In this regard, the computer program instructions which embody the procedures described above may be stored by a memory device, such as 50, 52, or 62, of a mobile device 10, network entity such as a server 16 or other apparatus employing embodiments of the present invention and executed by a processor 30, 60 in the mobile device, server or other apparatus. In some embodiments, the computer program instructions comprise location application 107*c* and/or location client applications 107*a*. In this regard, the operations described above in conjunction with the diagrams of FIGS. 4 and 9 may have been described as being performed by the communications device and a network entity such as a server, but any or all of the operations may actually be performed by the respective processors of these entities, for example in response to computer program instructions executed by the respective processors. As will be appreciated, any such computer program instructions may be loaded onto a computer or other programmable apparatus (i.e., hardware) to produce a machine, such that the instructions which execute on the computer (e.g., via a processor) or other programmable apparatus implement the functions specified in the flowcharts block(s). These computer program instructions may also be stored in a computer-readable memory, for example, memory 62 of server 16, that can direct a computer (e.g., the processor or another computing device) or other apparatus to function in a particular manner, such that the instructions stored in the computer-readable memory produce an article of manufacture including instructions which implement the functions specified in the flowcharts block(s). The computer program instructions may also be loaded onto a computer or other apparatus to cause a series of operations to be performed on the computer or other apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions, operations, or combinations of special purpose hardware and computer instructions.

In an exemplary embodiment, an apparatus for performing the methods of FIGS. 4 and 9 may include a processor (e.g., the processor(s) 30 and/or 60) configured to perform some or each of the operations described above with respect to FIGS. 4 and 9. The processor(s) may, for example, be configured to perform the operations (401-408 and 901-917)) by performing hardware implemented logical functions, executing stored instructions, or executing algorithms for performing each of the operations. Alternatively, the apparatus, for example server 16, may comprise means for performing each of the operations described above. In this regard, according to an example embodiment, examples of means for performing operations 401-408 may comprise, for example, the processor(s) 30 and/or 60 as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the mobile device 10 has been described as determining whether the wireless fingerprint corresponds to a previously observed wireless fingerprint, requesting and receiving an identification of the geographical location and associating the wireless fingerprint with the identification of the geographical location, a network entity 16, such as the server, may perform some or all of these operations and may then provide the current location to the mobile device for use, for example, in appropriately configuring and/or executing various applications. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving a space-to-access point histogram associated with an access point as observed in a space;
causing, at least in part, a normalizing of the space-to-access point histogram;
determining parameters of the normalized space-to-access point histogram; and
causing, at least in part, an applying of a feature selection function to the access point to assign a value to the access point, wherein the value is associated, at least in part, with one or more data triples.

2. A method according to claim 1, wherein the feature selection function is a weighting function and wherein the value is a weight that corresponds to the frequency with which the access point is observed within the space.

3. A method according to claim 1, wherein the parameters include the mean of the normalized space-to-access point histogram and the standard deviation of the normalized space-to-access point histogram.

4. A method according to claim 3, wherein each of the mean, the standard deviation, and the value are combined to form a data triple that represents the access point as observed in the space.

5. A method according to claim 4, wherein the method is repeated for each access point observed in the space such that a plurality of access points observed in the space are each represented by a data triple.

6. A method according to claim 5, wherein the plurality of data triples comprise a fingerprint.

7. A method according to claim 6, wherein at least one data triple, corresponding to the least significant value, is removed from the fingerprint creating a compressed fingerprint.

8. A method according to claim 7, wherein the compressed fingerprint is sent to a mobile device.

9. An apparatus comprising:
at least one processor; and
at least one memory including computer program code for one or more programs, the at least one memory and the computer program code configured to, with the at least one processor, cause the apparatus to:
receive a space-to-access point histogram associated with an access point as observed in a space;
cause, at least in part, a normalizing of the space-to-access point histogram;
determine parameters for the normalized space-to-access point histogram; and
causing, at least in part, an applying of a feature selection function to the access point to assign a value to the access point, wherein the value is associated, at least in part, with one or more data triples.

10. An apparatus according to claim 9, wherein the computer program code, with the at least one processor, is further configured to cause the apparatus to
receive a plurality of space-to-access point histograms corresponding to a plurality of access points as observed in the space;
cause, at least in part, a normalizing of each of the plurality of space-to-access point histograms;
determine parameters for each of the plurality of normalized space-to-access point histograms; and
causing, at least in part, an applying of a feature selection function to each of the plurality of access points to assign a value to each of the plurality of access points.

11. An apparatus according to claim 10, wherein the feature selection function is a weighting function and wherein the value is a weight that corresponds to the frequency with which the access point is observed within the space.

12. An apparatus according to claim 10, wherein determining the parameters for the plurality of normalized space-to-access point histogram includes determining the mean of each of the plurality of normalized space-to-access point histogram and determining the standard deviation for each of the plurality of normalized space-to-access point histogram.

13. An apparatus according to claim 12, wherein, each of the mean, standard deviation, and value corresponding to an access point are combined to form a data triple that represents the access point as observed in the space.

14. A method according to claim 13, wherein the plurality of data triples comprise a fingerprint.

15. A method according to claim 14, wherein at least one data triple, corresponding to the least significant value, is removed from the fingerprint creating a compressed fingerprint.

16. A method according to claim 15, wherein the compressed fingerprint is sent to a mobile device.

17. A non-transitory computer-readable storage medium carrying one or more sequences of one or more instructions which, when executed by one or more processors, cause an apparatus to at least perform the following steps:
receiving a space-to-access point histogram associated with an access point as observed in a space;
causing, at least in part, a normalizing of the space-to-access point histogram; program code instructions for calculating parameters of the normalized space-to-access point histogram; and
causing, at least in part, an applying of a feature selection function to the access point to assign a value to the access point, wherein the value is associated, at least in part, with one or more data triples.

18. A non-transitory computer-readable storage medium of claim 17, wherein the apparatus is caused to further perform:
receiving a plurality of space-to-access point histograms corresponding to a plurality of access points as observed in the space;
causing, at least in part, a normalizing of each of the plurality of space-to access point histograms;
determining parameters for each of the plurality of normalized space-to-access point histograms; and
causing, at least in part, an applying of a feature selection function to each of the plurality of access points to assign a value to each of the plurality of access points.

19. A non-transitory computer-readable storage medium of claim 18, wherein the feature selection function is a weighting function and wherein the value is a weight that corresponds to the frequency with which the access point is observed within the space.

20. A non-transitory computer-readable storage medium of claim 18, wherein the program code instructions for calculating parameters of the plurality of normalized space-to-access point histograms includes program code instructions for calculating the mean of each of the plurality of normalized space-to-access point histograms and calculating the standard deviation of each of the plurality of normalized space-to-access point histograms.

21. A non-transitory computer-readable storage medium of claim 20, wherein each of the mean, standard deviation, and weight corresponding to an access point are combined to form a data triple that represents the access point as observed in the space.

22. A non-transitory computer-readable storage medium of claim 21, wherein the plurality of data triples comprise a fingerprint.

23. A non-transitory computer-readable storage medium of claim 22, wherein the apparatus is caused to further perform:
causing, at least in part, a removing from the fingerprint at least one data triple corresponding to the least significant value, creating a compressed fingerprint.

24. A non-transitory computer-readable storage medium of claim 23, wherein the apparatus is caused to further perform:
causing, at least in part, a transmission of the compressed fingerprint to a mobile device.

* * * * *